US007247199B2

(12) United States Patent
Baydo et al.

(10) Patent No.: US 7,247,199 B2
(45) Date of Patent: Jul. 24, 2007

(54) FOOD GRADE INK JET INKS FOR PRINTING ON EDIBLE SUBSTRATES

(76) Inventors: Robert A. Baydo, 777 Pebble Beach, San Marcos, CA (US) 92067; Michael Bogomolny, 9472-8 Compass Point Dr. South, San Diego, CA (US) 92126; Constance L. Lee, 31904 Runway Dr., Pauma Valley, CA (US) 92061

( * ) Notice: Subject to any disclaimer, the term of this patent is extended or adjusted under 35 U.S.C. 154(b) by 0 days.

(21) Appl. No.: 10/918,197

(22) Filed: Aug. 13, 2004

(65) Prior Publication Data
US 2005/0255205 A1  Nov. 17, 2005

Related U.S. Application Data

(60) Provisional application No. 60/570,436, filed on May 12, 2004.

(51) Int. Cl.
*C09D 11/00* (2006.01)
(52) U.S. Cl. .................... 106/31.86; 106/31.74
(58) Field of Classification Search ............. 106/31.86, 106/31.74
See application file for complete search history.

(56) References Cited

U.S. PATENT DOCUMENTS

| | | | |
|---|---|---|---|
| 2,258,347 A | 10/1941 | Biggert, Jr. | |
| 2,385,613 A | 9/1945 | Davis | |
| 2,948,626 A | 8/1960 | Sanders, Jr. | |
| 2,982,234 A | 5/1961 | Ackley et al. | |
| 3,015,610 A | 1/1962 | Sanders, Jr. | |
| 3,258,347 A | 6/1966 | Brown | |
| 3,694,237 A | 9/1972 | Piotroski et al. | |
| 4,021,252 A | 5/1977 | Banczak et al. | |
| 4,168,662 A | 9/1979 | Fell | |
| 4,177,075 A | 12/1979 | Mansukhani | |
| 4,239,543 A | 12/1980 | Beasley | |
| 4,421,559 A | 12/1983 | Owatari | |
| 4,512,807 A | 4/1985 | Ogawa et al. | |
| 4,548,825 A | 10/1985 | Voss et al. | |
| 4,578,273 A | 3/1986 | Krubert | |
| 4,601,756 A | 7/1986 | Chiba et al. | |
| 4,620,876 A | 11/1986 | Fujii et al. | |
| 4,670,271 A | 6/1987 | Pasternak | |
| 4,694,302 A | 9/1987 | Hackleman et al. | |
| 4,761,180 A | 8/1988 | Askeland et al. | |
| 4,781,758 A | 11/1988 | Gendler et al. | |
| 4,791,165 A | 12/1988 | Bearss et al. | |
| 4,810,292 A | 3/1989 | Palmer et al. | |
| 4,853,037 A | 8/1989 | Johnson et al. | |
| 5,006,362 A | 4/1991 | Hilborn | |
| 5,091,004 A | 2/1992 | Tabayashi et al. | |
| 5,112,399 A | 5/1992 | Slevin et al. | |
| 5,152,969 A | 10/1992 | Kleid et al. | |
| 5,156,675 A | 10/1992 | Breton et al. | |
| 5,221,332 A | 6/1993 | Kohlmeier | |
| 5,281,261 A | 1/1994 | Lin | |
| 5,316,575 A | 5/1994 | Lent et al. | |
| 5,397,387 A | 3/1995 | Deng et al. | |
| 5,409,715 A | 4/1995 | Meyers | |
| 5,423,252 A | 6/1995 | Yamamoto et al. | |
| 5,431,720 A | 7/1995 | Nagai et al. | |
| 5,431,722 A | 7/1995 | Yamashita et al. | |
| 5,435,840 A | 7/1995 | Hilborn | |
| 5,439,514 A | 8/1995 | Kashiwazaki et al. | |
| 5,443,628 A | 8/1995 | Loria et al. | |
| 5,453,122 A | 9/1995 | Lyon | |
| 5,462,590 A | 10/1995 | Yui et al. | |
| 5,466,287 A | 11/1995 | Lyon | |
| 5,505,755 A | 4/1996 | Ernst | |
| 5,522,922 A | 6/1996 | Furusawa et al. | |
| 5,531,818 A | 7/1996 | Lin et al. | |
| 5,534,281 A | 7/1996 | Pappas et al. | |
| 5,580,372 A | 12/1996 | Gino et al. | |
| 5,601,639 A | 2/1997 | Myers et al. | |
| 5,624,485 A | 4/1997 | Calhoun | |
| 5,637,139 A | 6/1997 | Morelos et al. | |
| 5,667,569 A | 9/1997 | Fujioka | |
| 5,681,380 A | 10/1997 | Nohr et al. | |
| 5,705,247 A | 1/1998 | Arai et al. | |

(Continued)

FOREIGN PATENT DOCUMENTS

CN          662 358       12/1978

(Continued)

OTHER PUBLICATIONS

Tolliver-Nigro, "Taking the Sting Out of No-Tox," *Ink Maker*.
Ingredient Statement: 6# Refined Glaze in Butylac; Origination Date: Jan. 9, 2004.
Ingredient Statement: 8# Esterified Shellac M-4; Origination Date: Jan. 9, 2004.
Ingredient Statement: Mantrolac R-100 in Propylene Glycol FG; Origination Date: Jan. 12, 2004.
Technical Information: 8# White French Varnish M-4. Mantrose-Bradshaw-Zinsser Group.
Technical Information: Certified R-100 Refined Bleached Shellac. Mantrose-Bradshaw-Zinsser Group.
Ingredient Statement: Certified R-100 Refined Bleached Shellac; Origination Date Jun. 25, 2001.
Material Safety Data Sheet, Certified R-100 Refined Bleached Shellac, Mantrose-Haeuser Company; Origination Date: May 1, 2001.
Database WPI Week 2001, Derwent Publications Ltd., London, GB; AN 2001-409143 (XP002348407), Li, Y.: "High grade edible paint mimeograph," & CN 1 158 346 A (LI Y) (Sep. , 1997) abstract.

*Primary Examiner*—J. A. Lorengo
*Assistant Examiner*—Veronica Faison-Gee
(74) *Attorney, Agent, or Firm*—Michael Best & Friedrich LLP

(57) ABSTRACT

Food grade ink jet inks which include food grade pigments, food grade lower alcohols, 1,2-propanediol, and shellacs are provided. Also provided are methods for making the ink jet inks and edible substrates having the food grade ink jet inks applied to a surface thereof. In some embodiments, the food grade ink jet inks contain at least about 20 wt. % propanediol.

57 Claims, No Drawings

U.S. PATENT DOCUMENTS

| | | |
|---|---|---|
| 5,800,601 A | 9/1998 | Zou et al. |
| 5,935,310 A | 8/1999 | Engel et al. |
| 5,961,703 A | 10/1999 | Fraas |
| 5,972,085 A | 10/1999 | Simpson |
| 6,020,397 A | 2/2000 | Matzinger |
| 6,058,843 A | 5/2000 | Young |
| 6,067,996 A | 5/2000 | Weber et al. |
| 6,123,848 A | 9/2000 | Dominguez et al. |
| 6,231,654 B1 | 5/2001 | Elwakil |
| 6,267,997 B1 | 7/2001 | Ream et al. |
| 6,576,347 B1 | 6/2003 | Gomez Portela |
| 6,607,744 B1 | 8/2003 | Ribi |
| 6,616,958 B1 | 9/2003 | Stewart |
| 6,623,553 B2 | 9/2003 | Russell et al. |
| 6,648,951 B2 | 11/2003 | Chen et al. |
| 6,652,897 B1 | 11/2003 | Stewart |
| 6,660,318 B2 | 12/2003 | Yoon et al. |
| 6,706,098 B2 | 3/2004 | Leu et al. |
| 6,747,072 B1 | 6/2004 | Siddiqui |
| 6,866,863 B2 | 3/2005 | Ribi |
| 6,893,671 B2 | 5/2005 | Ben-Yoseph et al. |
| 2001/0038871 A1 | 11/2001 | Nardi |
| 2001/0046535 A1 | 11/2001 | Bowling |
| 2002/0008751 A1 | 1/2002 | Spurgeon et al. |
| 2002/0034475 A1 | 3/2002 | Ribi |
| 2002/0078858 A1 | 6/2002 | Chen et al. |
| 2002/0114863 A1 | 8/2002 | Ream et al. |
| 2002/0114878 A1 | 8/2002 | Ben-Yoseph et al. |
| 2002/0135651 A1 | 9/2002 | Spurgeon et al. |
| 2003/0037700 A1 | 2/2003 | Leu et al. |
| 2003/0097949 A1 | 5/2003 | Candler et al. |
| 2003/0103905 A1 | 6/2003 | Ribi |
| 2003/0161913 A1 | 8/2003 | Stewart |
| 2003/0198720 A1 | 10/2003 | Stewart |
| 2004/0013778 A1 | 1/2004 | Ackley, Jr. et al. |
| 2004/0021757 A1 | 2/2004 | Shastry et al. |
| 2004/0050289 A1 | 3/2004 | Russell et al. |
| 2004/0086603 A1 | 5/2004 | Shastry et al. |
| 2004/0120991 A1 | 6/2004 | Gardner et al. |
| 2004/0170725 A1 | 9/2004 | Begleiter |
| 2004/0175463 A1 | 9/2004 | Shastry et al. |
| 2004/0213875 A1 | 10/2004 | Stewart |
| 2005/0003055 A1 | 1/2005 | Baydo et al. |
| 2005/0003056 A1 | 1/2005 | Romanach et al. |
| 2005/0058749 A1 | 3/2005 | Romanach et al. |
| 2005/0058753 A1 | 3/2005 | Romanach et al. |
| 2005/0061184 A1 | 3/2005 | Russell et al. |
| 2005/0069612 A1 | 3/2005 | Romanach et al. |
| 2005/0157148 A1 | 7/2005 | Baker et al. |
| 2005/0163898 A1 | 7/2005 | Romanach et al. |
| 2006/0038866 A1 | 2/2006 | Wen et al. |
| 2006/0110551 A1 | 5/2006 | Shastry et al. |
| 2006/0182856 A1 | 8/2006 | Omelaz |

FOREIGN PATENT DOCUMENTS

| | | |
|---|---|---|
| CN | 660 750 | 6/1987 |
| EP | 0475075 | 11/1995 |
| EP | 0705890 | 4/1996 |
| GB | 2277094 | 10/1994 |
| JP | 58052375 A | 3/1983 |
| JP | 63063363 | 3/1988 |
| WO | WO 92/14795 | 3/1992 |
| WO | WO 95/27758 | 10/1995 |
| WO | WO 97/17409 | 5/1997 |
| WO | WO 97/35933 | 10/1997 |
| WO | WO 01/94116 | 12/2001 |
| WO | 02/085995 | 10/2002 |
| WO | 2004/003089 | 1/2004 |
| WO | 2004/012518 | 2/2004 |
| WO | 2004/080191 | 9/2004 |
| WO | 2005/002360 | 1/2005 |
| WO | 2005/006884 | 1/2005 |
| WO | 2005/027655 | 3/2005 |
| WO | 2006/023615 | 3/2006 |
| WO | 2006/086780 | 8/2006 |
| WO | 2006/086781 | 8/2006 |
| WO | 2006/121936 | 11/2006 |

FOOD GRADE INK JET INKS FOR PRINTING ON EDIBLE SUBSTRATES

CROSS-REFERENCE TO RELATED APPLICATION

This application claims priority to U.S. provisional patent application Ser. No. 60/570,436, filed May 12, 2004. The entire disclosure of which is incorporated herein by reference and for all purposes.

BACKGROUND

Ink jet printing is a printing application with the potential for wide use in decorating the surfaces of food items. However, in order to be suitable for use on foods, ink formulations should be food grade formulations, should be compatible with the food surfaces onto which they will be applied, and should have properties (e.g., viscosities, surface tensions, smear resistance, solubilities, drying times) that make them suitable for use with ink jet printers. Few presently available inks meet all of these limitations. For example, many ink jet ink formulations include compounds that cause deleterious health effects when ingested by humans. Other ink formulations have high water contents, resulting in viscosities that are too low to permit the inks to be successfully jetted onto an edible surface. Still other ink jet ink formulations are incapable of being printed directly onto a food substrate without smearing or image bleed. This is particularly true for nonporous food substrates. One solution that has been used to deal with this latter problem is to print a decoration onto an edible paper, such as rice paper, and then to transfer the decoration from the decorated paper to a food item. Such a process involves multiple processing steps and is not well suited for use with food items of all shapes and sizes. A need continues to exist for a food grade ink jet ink formulations that can be printed directly onto the surfaces of a variety of food items to produce a high quality image using ink jet printing technology.

SUMMARY

Food grade ink jet inks for use in printing on edible substrates, methods for making the ink jet inks, and edible substrates having the ink jet inks applied thereto are provided. The ink jet inks typically include food grade pigments, such as food grade lakes; a carrier which commonly includes food grade lower alcohol(s) and/or food grade glycol(s), such as 1,2-propanediol; and a resin component which may include shellac. The shellac can act as a dispersant and stabilizing agent for the inkjet ink. The food grade ink jet inks can have characteristics that render them suitable for printing directly onto a variety of edible substrates. In particular, the food grade ink jet inks may be suitable for printing with ink jet printers, including piezoelectric ink jet printers. As used herein, the phrase "food grade" means that up to specified amounts of the particular ingredient can be ingested by a human without generally causing deleterious health effects. Examples of suitable food grade ingredients include those colorants approved by the FDA for use in foods for human consumption and other ingredients which are "generally recognized as safe" ("GRAS") by the United States Food and Drug Administration ("FDA"). In particular, food safe compounds include those compounds listed as approved under 21 C.F.R. §§ 73, 74, 172, 182 and 184.

The ink jet inks may contain substantial amounts of food grade glycol, desirably 1,2-propanediol. In some embodiments, the ink jet inks include at least about 20 weight percent (wt. %). This includes embodiments where the ink jet inks include at least about 25 wt. % food grade glycol and further includes embodiments where the ink jet inks include at least about 30 wt. % food grade glycol. For example, some of the ink jet ink formulations provided herein contain about 25 to 50 wt. % food grade glycol, e.g. formulations that contain about 30 to 45 wt. % 1,2-propanediol and/or other food grade glycol.

In addition to the food grade glycol, the ink jet inks typically also include at least one, and often a mixture of two or more food grade lower alcohols. Suitable food grade alcohols include butanol, ethanol and isopropanol. For example, some embodiments of the ink jet inks include butanol and other embodiments include a mixture of butanol and ethanol. The ink jet inks desirably, but not necessarily, include at least about 20 wt. % of one or more food grade lower alcohols. The ranges cited herein include any food grade alcohols and glycols that are introduced as a component of another additive, such as a shellac solution.

The food grade ink jet inks may be prepared with a relatively low water content. For example, in some embodiments, the food grade ink jet inks may contain no more than about 5 wt. % water. The food grade ink jet inks may be free of, or substantially free of, water, e.g., having a water content of no more than about 1 wt. %. In these compositions, any water present may be due solely or partially to water absorbed from the air under humid conditions and/or water introduced as an impurity or minor component of one of the pigments or solvents that make up the ink jet inks. It may be advantageous to limit the amount of water present in the ink jet inks because a high water content tends to decrease the viscosity of the fluids, rendering them less suitable for use in some printing applications, such as ink jet printing applications where elevated jetting temperatures are used. In addition, a high water content may increase the drying time for the inks, making them undesirable for use on some non-porous edible substrates.

Food grade pigments, including food grade lakes, are used to produced the ink jet inks provided herein. As used herein, the term pigment denotes pigments which are dispersible in a liquid carrier such as food grade lower alcohols and/or food grade glycols, such as 1,2-propanediol, employed as solvents in the food grade ink jet inks. The food grade pigments may be dispersible with or without the aid of a dispersing agent. A lake is a pigment formed by absorption of a dye on an insoluble particle base, such as alumina. The amount of dye associated with the base in a pigment may vary. For example, in some lakes, the dye is present in an amount of about 40 to 45 wt. %. Suitable lakes for use in the ink jet inks provided herein include, but are not limited to, lakes made from dyes such as FD&C Blue #1, FD&C Blue #2, FD&C Green #3, FD&C Red #2, FD&C Red #3, FD&C Red #40, FD&C Yellow #5, and FD&C Yellow #6. A description of these dyes may be found in 21 C.F.R., Part 74, pp. 326–363, Apr. 1, 1995. Pigment lakes are well known and commercially available. For example, lakes made from each of the above-referenced food grade dyes are commercially available in powder form and as lake concentrates from Sensient Colors Inc. in St. Louis, Mo.

The pigments preferably have a particle size that is small enough to allow them to form inks that will jet through ink jet print heads without clogging the heads and to form a stable ink formulation, as described in greater detail below. The pigments employed in the food grade ink jet inks typically have a mean particle size of no more than about 5 microns, desirably, no more than about 2 microns, and more desirably, no more than about 1 micron. For example, in some ink jet inks provided herein, pigments such as lakes, have mean particle sizes of between about 0.01 and 2 microns, e.g. about 0.1 to 1.0 microns. Dispersions of the above-referenced lake concentrates available from Sensient Colors Inc. provide pigments having mean particle sizes in these ranges.

In a typical embodiment, the ink jet inks may contain about 0.1 to 10 wt. % food grade pigment on a dry weight basis. This includes embodiments where the ink jet inks contain about 0.5 to 7.5 wt. % food grade pigment and further includes embodiments where the ink jet inks contain about 1 to 6 wt. % food grade pigment. For example, suitable inks may include about 1 to 4 wt. % of one or more FD&C lakes. The lakes commonly include about 35 to 45 wt. % food grade dye (as a percentage of the total weight of the lake).

In order to avoid corroding ink jet printer parts, it is desirable for the food grade ink jet inks to have a chloride ion content of no greater than about 0.01 wt. %, desirably no greater than about 0.005 wt. % and more desirably no more than about 0.003 wt. %. Some of the food grade ink jet inks may have even lower chloride ion contents. For example, some of the food grade ink jet inks have a chloride ion content of no greater than 0.002 wt. %. This includes food grade ink jet inks having a chloride ion content of no more than about 0.001 wt. %, further includes food grade ink jet inks having a chloride ion content of no more than about 0.0005 wt. % and still further includes food grade ink jet inks having a chloride ion content of no more than about 0.0002 wt. %. Alternatively stated, in some instances, the inks will have a chloride ion content of no greater than 100 ppm, desirably no greater than 50 ppm, more desirably no greater than 30 ppm, still more desirably no greater than 20 ppm, no greater than 10 ppm, no greater than 5 ppm or even no greater than 2 ppm. The food grade pigments are one possible source of chloride ions (in the form of sodium chloride) in the inks. For this reason, the use of food grade pigments, including food grade lakes, having a low chloride ion content may be advantageous. For example, in order to produce an ink with a chloride ion content of no more than about 100 ppm, the food grade pigment should have a chloride ion content of no more than about 1000 ppm if it is to be present in an amount of up to 10 wt. % in the ink. In some embodiments, the food grade pigment will have an even lower chloride ion content. This includes embodiments where the food grade pigment has a chloride ion content of no more than about 500 ppm, further includes embodiments where the food grade pigment has a chloride ion content of no more than about 250 ppm, further includes embodiments where the food grade pigment has a chloride ion content of no more than about 200 ppm, further includes embodiments where the food grade pigment has a chloride ion content of no more than about 100 ppm, further includes embodiments where the food grade pigment has: a chloride ion content of no more than about 50 ppm, and still further includes embodiments where the food grade pigment has a chloride ion content of no more than about 20 ppm.

The chloride in a food grade lake may be derived from the lake substrate (e.g. alumina) or the dye used to make the lake. Accordingly, it may be desirable to reduce the chloride content of the lake by washing the lake in a suitable washing solvent and/or by employing a food grade dye with a low chloride content to make the lake.

Because they are intended for use on edible substrates, the ink jet inks desirably include lakes made from high purity food grade dyes. For example, the food grade dyes used in the lakes may be at least about 85 wt. % pure. That is, the dyes may contain no more than about 15 wt. % contaminants and impurities, including moisture. In some instances, the food grade dyes from which the lakes are made are at least about 87 wt. % pure. Alternatively, the purity of the dyes may be analyzed on a strictly dry weight basis, in which case the food grade dyes are desirably at least about 92 wt. % pure. In some embodiments the food grade dyes are at least about 95 wt. % pure when analyzed on a dry weight basis. This includes embodiments where the food grade dyes are at least about 98 wt. % pure when analyzed on a dry weight basis.

In addition to the food grade pigment, food grade glycol and food grade lower alcohol, the ink jet inks include a shellac resin as a dispersant for the pigment particles. The amount of shellac solids present in the ink jet ink may vary depending on the desired viscosity of the ink. Thus, in some embodiments, the ink jet ink comprises from about 5 to about 25 wt. % shellac solids. This includes embodiments where the ink comprises about 5 to 10 wt. % shellac solids and also includes embodiments where the ink comprises about 20 to 25 wt. % shellac solids. As used herein, shellac refers to all forms of purified lac, the hardened resinous secretion of the insect Laccifer Lacca (Kerr) of the order Homopetra and the family Coccidae. Shellacs may be handmade, machine made, or bleached type. Bleached type shellacs may be refined bleached shellacs where the term "refined" indicates that the natural shellac wax has been removed. The major component of lac is a resin which upon mild hydrolysis gives a complex mixture of aliphatic and alicyclic hydroxy acids and their polyesters. Aleuritic acid is the major component of the aliphatic fraction and shelloic acid is the major component of the alicyclic fraction. Shellacs are commonly sold in the form of a confectioner's glaze where the shellac has been dissolved in a solvent carrier. Typically, the solvent includes an alcohol such as ethanol, butanol, or propanol and/or a glycol, such as 1,2-propanediol or ethylene glycol. Such solutions are available with various shellac concentrations or "lb. cuts." A lb. cut indicates the pounds of lac resin dissolved per one gallon of solvent. Thus, for example, an 8 lb. cut of confectioner's glaze contains about 8 lbs. of shellac per gallon of solvent. In order to avoid corrosion of printer parts, it may be advantageous to use shellacs having a low chloride ion content. Shellacs and confectioner's glazes are well known and commercially available. For example, suitable commercially available shellacs include, but are not limited to, Mantrolac R-100 Refined Bleached Shellac, 8 # White French Varnish M-4 and 6 # Refined Glaze in n-butyl alcohol from Mantrose, Bradshaw and Zinsser Group (Westport, Conn.).

In order to produce food grade ink jet inks with low chloride ion contents, it is desirable to use a shellac having a low chloride ion content. For example, shellacs having a chloride ion content of no more than about 200 ppm may be used to prepare the food grade ink jet inks. This includes shellacs having a chloride ion content of no more than about 100 ppm, desirably no more than about 50 ppm and more desirably no more than about 20 ppm. When low chloride ion content inks are desired it may be advantageous to use non-bleached shellacs as these tend to have a lower chloride ion content than bleached shellacs.

In addition to food grade pigments, food grade glycols, food grade lower alcohols and shellacs, the food grade ink jet inks may contain various food grade additives such as surface tension modifiers, thickening agents, antioxidants, preservatives, buffering agents, and/or antimicrobial agents.

These additional additives are typically present in small quantities, for example no more than about 10 wt. % and commonly no more than about 5 wt. %.

The ink jet inks desirably have properties that render them suitable for use as printing inks in various types of printers including ink jet printers which utilize piezoelectric print heads. Viscosity is one property of the ink jet inks that may be controlled to produce inks suitable for ink jet printing. If the viscosity of the ink jet inks is too great they will not jet properly. For this reason, the viscosity of the ink jet inks should generally be no more than about 100 centipoise (cps) at 25° C. More generally, it is typically desirable for the ink jet inks to have a viscosity of about 5 to 20 cps at the jetting temperature at which the printing is to take place. This includes embodiments where the ink jet inks have a viscosity of about 8 to 14 cps at the jetting temperature at which the printing is to take place. In some embodiments, the ink jet inks have a viscosity of 8 to 12 cps at the desired jetting temperature. Typical jetting temperatures may range from room temperature (about 25° C.) to elevated temperatures of up to about 80° C. or even higher. Typical elevated jetting temperatures may range from about 50 to 70° C. For example, an ink jet ink may have a viscosity of about 8 to 14 cps at a jetting temperature of 60° C. Alternatively, the ink jet inks may be formulated to have a viscosity of no more than about 75 cps at 25° C. For example, the ink jet inks may have a viscosity of no more than about 50 cps at 25° C. This includes embodiments where the ink jet inks have a considerably lower viscosity at 25° C. For example, in some embodiments, the ink jet inks will have a viscosity of about 5 to 14 cps at 25° C. In other embodiments, the viscosity will be much higher. For example, in some embodiments, the ink jet inks will have a viscosity of about 55 to 65 cps at 25° C.

The food grade ink jet inks should have viscosity stabilities that allow a reasonable amount of storage time without significant sedimentation. The viscosity stability of the inks may be evaluated by measuring the constancy of viscosity over a period of time. The food grade inks provided herein desirably exhibit a change in viscosity at 25° C. of no more than about 2% after storage at 50° C. over a period of at least 1 week. This includes embodiments where the food grade inks exhibit a change in viscosity at 25° C. of no more than about 3% after storage at 50° C. over a period of at least 3 weeks and further includes embodiments where the food grade inks exhibit a change in viscosity at 25° C. of no more than about 4% after storage at 50° C. over a period of at least 7 weeks. For example, the inks may exhibit a change in viscosity at 25° C. of no more than about 1.5% after storage at 50° C. over a period of at least 1 week, no more than about 2.5% after storage at 50° C. over a period of at least 3 weeks and no more than about 3.5% after storage at 50° C. over a period of at least 7 weeks.

The ink jet inks will typically have surface tensions of about 20 to 60 dynes per centimeter (dynes/cm) at 25° C. This includes embodiments where the ink jet inks have surface tensions of about 25 to 50 dynes/cm at 25° C. and further includes embodiments where the ink jet inks have surface tensions of about 25 to 35 dynes/cm at 25° C.

Once prepared, the food grade ink jet inks may be printed directly onto the surface of an edible substrate using conventional printing equipment such as ink jet printers. Although the ink jet inks provided herein are well suited for printing onto nonporous edible substrates, they can also be used with porous edible substrates. Suitable edible substrates onto which the inks may be printed include, but are not limited to, chocolates, candies, breakfast bars, crackers, waffles, mints, fruit roll ups, chewing gum, biscuits, cereal, taco shells, granola bars, rice cakes, cookies, pie crusts, cakes, including snack cakes, marshmallows, pasta, and bread products.

The ink jet inks are typically prepared in a two-step process. In a first step, an admixture which includes lower food grade alcohol (e.g., butanol), shellac solution (i.e., confectioner's glaze), food grade glycol (e.g., 1,2-propanediol), and food grade pigment (e.g., a food grade lake) is formed. The admixture is subjected to shear for a time sufficient to disperse the pigment. In a subsequent step, additional food grade lower alcohol (e.g., ethanol), shellac solution and food grade glycol (e.g. 1,2-propanediol) is mixed to form a diluent. The food grade lower alcohol and shellac solution in the diluent may be the same as or different from those in the pigment dispersion. The diluent is then mixed with the pigment dispersion in the proportions necessary to provide an ink jet ink having the desired pigment concentration.

DETAILED DESCRIPTION

Food grade ink jet inks are provided. The food grade ink jet inks, which contain at least one food grade pigment, at least one food grade glycol, at least one food grade lower alcohol, and at least one shellac, are useful for printing directly onto the surfaces of various edible substrates, especially nonporous edible substrates. As used herein, "food grade" means that up to specified amounts of the particular compounds can be ingested by a human without generally causing deleterious health effects. Therefore, in order to meet the standard of a "food grade" ink jet ink, the ink jet ink should be free or substantially free of compounds that generally cause deleterious health effects when ingested by a human. When such compounds are present, e.g., in trace amounts through contamination, those compounds should be present in amounts below those that would result in the deleterious health effects.

The food grade ink jet inks are well-suited for use with a variety of ink jet piezo print heads. Examples of manufacturers from which the print heads may be obtained include Spectra, Xaar, Hitachi and PicoJet.

Edible substrates onto which the ink jet inks have been applied are also provided. Examples of edible substrates onto which the ink jet inks may be printed include, but are not limited to, chocolates, candies, breakfast bars, crackers, waffles, mints, fruit roll ups, chewing gum, biscuits, cereal, taco shells, granola bars, rice cakes, cookies, pie crusts, cakes, including snack cakes, marshmallows, pasta, and various bread products such as toast, buns, bagels, and tortillas. The ink jet inks provided herein are well suited for application to nonporous substrates.

The food grade glycol acts as a solvent and may account for a large part of the ink jet ink. For example, the food grade glycol may account for at least about 20 wt. % of the ink jet ink. This includes embodiments where the food grade glycol accounts for at least about 25 wt. % of the ink jet ink and further includes embodiments where the food grade glycol accounts for at least about 30 wt. % of the ink jet ink and still further includes embodiments where the food grade glycol accounts for at least about 35 wt. % of the ink jet ink. The food grade glycol is desirably 1,2-propanediol. In one exemplary embodiment, the food grade ink jet ink contains about 30 to 45 wt. % 1,2-propanediol and about 25 to 65 wt. % food grade lower alcohol.

One or more food grade lower alcohols may be present as co-solvents in the food grade ink jet inks. Suitable lower alcohols include ethanol, butanol, isopropanol, or mixtures thereof. In some embodiments, the ink jet inks will include butanol as a co-solvent. In other embodiments, the ink jet inks will include ethanol as a co-solvent. In still other embodiments, the ink jet inks will include a mixture of butanol and ethanol as a co-solvent. Some formulations of the ink jet inks may contain at least about 20 wt. % food grade lower alcohol, at least about 25 wt. % food grade lower alcohol or at least about 30 wt. % food grade lower alcohol. In some exemplary embodiments, the ink jet inks contain at least about 5 wt. % butanol and/or at least about 15 wt. % ethanol. This includes embodiments that contain about 5 to 25 wt. % butanol and about 15 to 50 wt. % ethanol.

Although water may also be present as a co-solvent, it is generally present only in small amounts. For example, in some embodiments, the ink jet inks contain no more than about 5 wt. % water. In other embodiments, the ink jet inks are free of or are substantially free of water, e.g., contain no more than about 1 wt. % and desirably no more than about 0.5 wt. % water.

The food grade pigments used to make the ink jet inks may include any pigment that is dispersible in at least one of 1,2-propanediol, ethanol, butanol, or mixtures thereof. Examples of suitable pigments include, but are not limited to, lakes made with FD&C dyes (e.g., FD&C Blue #1, FD&C Blue #2, FD&C Green #3, FD&C Red #2, FD&C Red #3, FD&C Red #40, FD&C Yellow #5, and FD&C Yellow #6). These lakes generally have a dye content of about 35 to 45 wt. % based on the total weight of the lake. Although the relative amount of the food grade pigments used in the food grade ink jet inks may vary depending on the desired color, shade, and intensity of the ink, the food grade ink jet inks will typically contain about 0.1 to 10 wt. % based on the dry weight basis of the food grade pigments. This includes embodiments where the ink jet inks contain about 0.5 to 7.5 wt. % based on the dry weight basis of the food grade pigment and further includes embodiments where the ink jet inks contain about 0.5 to 6 wt. % based on the dry weight basis of the food grade pigment. For example, in some embodiments the ink jet inks may contain about 1 to 5.5 wt. % based on the dry weight of basis of the food grade pigments.

Certain impurities in the food grade ink jet inks may tend to corrode printer parts and shorten printer lifetimes. Chloride ions are an example of one such impurity. Therefore, in order to avoid corroding ink jet printer parts, it is desirable for the food grade ink jet inks to have a chloride ion content of no greater than about 0.01 wt. %, desirably no greater than about 0.005 wt. % and more desirably no more than about 0.003 wt. %. Some of the food grade ink jet inks provided herein may have a chloride ion content of no greater than about 0.002 wt. %, no greater than about 0.001 wt. %, no greater than 0.0005 wt. %, or even no greater than about 0.0002 wt. %. Alternatively stated, in some instances, the inks will have a chloride ion content of no greater than 100 ppm and desirably no greater than 50 ppm or even no greater than 30 ppm. This includes food grade ink jet inks having a chloride ion content of no greater than 20 ppm, no greater than about 10 ppm, no greater than about 5 ppm and no greater than about 2 ppm. Thus, as an illustrative example, some of the food grade pigments used to produce the food grade inks will have a chloride ion content of no more than about 1000 ppm. In some embodiments, the food grade pigment will have an even lower chloride ion content. This includes embodiments where the food grade pigment has a chloride ion content of no more than about 500 ppm and further includes embodiments where the food grade pigment has a chloride ion content of no more than about 250 ppm. Also included are food grade pigments having a chloride ion content of no more than about 200 ppm, no more than about 100 ppm, no more than about 50 ppm and no more than about 20 ppm.

Sulfate ions are another example of impurities that may corrode printer parts. For this reason it may be desirable for the food grade ink jet inks to have a sulfate ion content of no greater than about 0.01 wt. % and desirably no greater than about 0.005 wt. % (as sodium sulfate). Alternatively stated, in some instances, the inks will have a sulfate ion content of no greater than 100 ppm, desirably no greater than 50 ppm and more desirably no more than 30 ppm. In fact, some of the food grade ink jet inks provided herein have a sulfate ion content of no greater than 10 ppm, no greater than about 5 ppm, or even no greater than about 1 ppm. Thus, as an illustrative example, some of the food grade pigments used to produce the food grade inks will have a sulfate content of no more than about 1000 ppm. In some embodiments, the food grade pigment will have an even lower sulfate content. This includes embodiments where the food grade pigment has a sulfate content of no more than about 500 ppm and further includes embodiments where the food grade pigment has a sulfate content of no more than about 250 ppm.

One way to assess the chloride and sulfate ion content of the lakes used to produce the ink jet inks provided herein is to measure the conductivity of an aqueous solution containing the lakes. For example, powdered lakes may be slurried (e.g. via high shear mixing) to produce a solution of 5 wt. % lake in high purity water, where the high purity water itself has a conductivity of no more than 350 microSiemens/cm ($\mu$S/cm). The aqueous phase in contact with the lakes in the resulting slurry will desirably have a conductivity of no more than about 10,000 ($\mu$S/cm), more desirably no more than about 5,000 ($\mu$S/cm) and still more desirably no more than about 2,000 ($\mu$S/cm). The conductivity may be measured using a conventional conductivity meter. One suitable method for purifying lakes to produce low chloride and/or sulfate content lakes is described in U.S. Pat. No. 6,123,848, the entire disclosure of which is incorporated herein by reference.

Shellacs are used as dispersants for the food grade pigments in the ink jet inks provided herein. The amount of shellac present in the ink jet inks may vary depending on the desired viscosity and/or the amount of pigment present in the formulation. Generally, however, the ink jet inks may contain at least about 2 wt. % shellac based on the amount of shellac solids. This includes ink jet ink formulations that contain at least about 4 wt. % shellac and further includes ink jet ink formulations that contain at least about 5 wt. % shellac. Typically the ink jet inks may contain about 2 to 25 wt. % shellac. For example, in one embodiment of the ink jet ink, shellac is present in an amount of about 5 to 10 wt. %. In other embodiments, however, shellac may be present in much higher amounts. For example, in one ink jet ink formulation, shellac accounts for about 20 to 25 wt. % of the ink jet ink.

Alternatively, the ratio of shellac solids to pigment in the ink jet ink may be used to characterize the ink. This ratio will affect the stability of inks made with the shellacs. Food grade ink jet ink formulations may be provided having a weight ratio of shellac solids to pigment based on the dry weight of the pigment of about 0.8 to 5. In other higher viscosity ink formulations, the weight ratio of shellac solids to pigment based on the dry weight of the pigment in the ink formulation may be about 5 to 7.

The ratio of food grade glycol to shellac solids in the ink formulation may also be used to characterize the inks. For example, food grade ink jet inks may be provided which have a weight ratio of food grade glycol (e.g., 1,2-propanediol) to shellac solids of at least about 1.5. This includes embodiments where the weight ratio of food grade glycol to shellac solids in the ink jet ink ranges from about 1.5 to 10, including embodiments where the weight ratio of food grade glycol to shellac solids is at least about 1.8. In many instances the weight ratio of food grade glycol to shellac solids is at least about 3.

In addition to the food grade pigments, the food grade glycols, the food grade lower alcohols, and the shellacs, the food grade ink jet inks may contain other food grade additives such as surface tension modifiers, thickening agents, antioxidants, preservatives, buffering agents, and antimicrobial agents. These additional additives will typically be present only in small quantities. For example, the additional food grade additives may be present in amounts of no more than 10 wt. %. This includes embodiments where the food grade additives are present in amounts of no more than 5 wt. % and further includes embodiments where the food grade additives are present in amounts of no more than about 3 wt. %. For some applications, it is desirable to exclude certain additives. For example, some food grade ink jet inks in accordance with this disclosure may be free of, or substantially free of, hydrocarbon solvents such as cyclohexane. Some of the food grade ink jet inks are free of or substantially free of cellulosic resins and/or rosin resins. A food grade ink jet ink is "substantially free of" an additional food grade additive if the ink jet ink contains no more than about 0.5 wt. % of the additional food grade additive. In some instances, the food grade ink jet inks contain no more than about 0.2 wt. % of a given additive. In still other instances, the food grade ink jet inks contain no more than about 0.1 wt. % of a given additive.

For ink jet printing applications, it is generally desirable for the ink jet inks to have a viscosity of about 5 to 20 and more desirably 8 to 14 centipoise (cps) at the jetting temperature at which the printing is to take place. This includes embodiments where the ink jet inks have a viscosity of 8 to 12 cps at the desired jetting temperature. Some ink jet printers are designed to be operated at ambient temperatures (i.e., about 25° C.). Other ink jet printers are designed for operation at elevated print head temperatures. For example, an ink jet printer may operate at jetting temperatures ranging from about 50 to 70° C. Therefore, the formulation of the ink jet inks, including the ratio of shellac to pigment, is desirably controlled to provide a suitable viscosity for the intended jetting temperature. For example, an ink jet ink may be tailored to have a viscosity of about 8 to 14 cps at a jetting temperature of 60° C. However, the viscosity of these ink jet inks may be significantly higher at ambient temperatures. For example, the ink jet inks may have viscosities of up to about 75 cps or even up to about 100 cps at 25° C. This includes embodiments where the ink jet inks have viscosities of about 5–75 cps at 25° C., further includes embodiments where the ink jet inks have a viscosity of about 3–14 cps at 25° C.

The surface tension of the ink jet inks may vary over a relatively wide range provided it is suitable to allow the ink jet inks to be jetted through an ink jet printing head and printed onto the surface of an edible substrate. In some embodiments, the ink jet inks will have surface tensions of about 20–60 dynes/cm at 25° C. This includes embodiments where the ink jet inks have surface tensions of about 25–50 dynes/cm at 25° C. and further includes embodiments where the ink jet inks have surface tensions of about 25–35 dynes/cm at 25° C.

The pH values of the food grade ink jet inks are not critical. However, when lakes are present the pH of the ink jet inks should be low enough to prevent the dyes in the lakes from separating out. Thus, it may be advantageous to provide ink jet inks with an apparent pH of no more than about 6, and desirably no more than about 5.5. Generally, the ink jet inks include, but are not limited to, those having an apparent pH in the range of about 4 to 6. Apparent pH values may be read directly from any suitable commercially available pH meter. Although these apparent pH values may neither be interpreted as an index of hydrogen ion potential, nor used in equilibrium computations, they are reproducible and useful for qualitative purposes.

The food grade ink jet inks provided herein may be made using a two-step process. In a first step a pigment dispersion is formed and in a second step the pigment dispersion is combined with a diluent to provide an ink jet ink. Each of these steps is described in greater detail below and exemplified in Examples 1 and 2.

The pigment dispersion may be made by admixing a food grade lower alcohol, a shellac solution, a food grade glycol and a food grade pigment and subjecting the admixture to shear for a time sufficient to disperse the pigment. Typically the dispersing of the pigment will occur in a two-stage process. Initially a pre-mix is made by mixing the food grade alcohol, shellac solution and food grade glycol under high shear while gradually adding food grade pigment. This may be accomplished, for example, using a rotor-stator mixer. The resulting pre-mix is then added to a mill (e.g. a media mill) where further pigment dispersion and particle size reduction occurs. Milling continues for a time sufficient to produce pigments having a small mean particle size in a stable dispersion. In some instances the milling continues for no more than about 90 minutes. This includes embodiments where milling occurs for about 40 to 70 minutes. The particle size of the pigments in the final dispersion is desirably no more than about 1 micron and more desirably no more than 500 nm (e.g., 150 to 500 nm). This includes dispersions having a mean particle size of about 150 to about 250 nm. It has been found, however, that over-milling may produce particles that are too small in view of the amount shellac present, leading to gellation of the pigment dispersion and rendering the pigment dispersions unsuitable for use in ink jet inks. Thus, the pigment dispersions provided herein are desirable free from or substantially free from gellation.

The amount of food grade lower alcohol in the pigment dispersion is desirably at least about 50 wt. % and the amount of food grade glycol in the pigment dispersion is desirably at least about 0.5 wt. %. The amount of shellac solids in the pigment dispersion is desirably at least 5 wt. % and the amount of food grade pigment in the pigment dispersion is desirably at least about 5 wt. %. For example, the pigment dispersion may contain about 5 to 20 wt. % food grade pigment (e.g. FD&C lake) and/or about 5 to 15 wt. % shellac solids. The ratio of shellac solids to pigment in a typical pigment dispersion is desirably between about 0.1 and 2. Some exemplary pigment dispersions will contain about 60 to 70 wt. % food grade lower alcohol (e.g. butanol), about 7.5 to 12.5 wt. % shellac solids, about 1 to 15 wt. % food grade glycol (e.g. 1,2-propanediol) and about 5 to 20 wt. % food grade pigment (e.g. FD&C lake).

Although other food grade lower alcohols may be used, it has been discovered that butanol is particularly well-suited for use in forming the pigment dispersions provided herein.

Once the pigment dispersion has been formed, it may be used to produce an ink by mixing it with a dilution composed of additional food grade lower alcohol, additional shellac solution and additional food grade glycol. This can be accomplished by adding the diluent to the pigment dispersion. In some food grade ink jet ink formulations the amount of pigment dispersion used to formulate the ink is about 5 to 50 wt. %. This includes embodiments where the amount of pigment dispersion used to formulate the ink is about 5 to 40 wt. % and further includes embodiments where the amount of pigment dispersion used to formulate the ink is about 10to35wt. %.

The food grade lower alcohol in the diluent may be the same food grade lower alcohol used in the pigment dispersion. However, in some instances it may be desirable to use a different food grade alcohol in each of the two steps. Although other food grade lower alcohols may be used, it has been discovered that ethanol is particularly well-suited for use in the diluents. Thus, in some embodiments, the food grade ink jet inks will be made from a butanol-containing pigment dispersion and an ethanol-containing diluent.

The following illustrative embodiments are intended to further exemplify the food grade ink jet inks. These embodiments should be not interpreted as limiting the scope of the ink jet inks disclosed herein.

EXAMPLES

Exemplary embodiments of the present food grade ink jet inks are provided in the following examples. The following examples are presented to illustrate the ink jet inks and methods for producing the ink jet inks to assist one of ordinary skill in making and using the same.

Instrumentation and Measurements

Examples 2 and 3 below provide examples of various food grade ink jet inks. The formulations (in wt. %) for the pigment dispersions from which the inks are made are provided in Table 1. The formulations (in wt. %) for the ink jet inks made from the pigment dispersions and several physical characteristics of the inks are provided in Table 2. The physical characteristics presented in Table 2 were measured as follows. Viscosity measurements were obtained using a Brookfield Programmable LVDV II$^+$ Digital Calculating Viscometer and a Brookfield DV III Rheometer Model V3.3LV with ULA spindle manufactured by Brookfield Engineering Laboratories, Inc., Middleboro, Mass. Surface tension measurements were made using the DuNuoy Ring tensiometer method. The DuNuoy Ring tensiometer (Fisher Model 20 manual DuNuoy Ring Tensiometer or CSC Model 70535) may be obtained from Fisher Scientific or CSC Scientific Co., Fairfax, Va. or from companies such as Cole Palmer or VWR. The apparent pH values were read directly from an Orion Model 420A electronic pH meter with an Orion 91-55 electrode, after calibrating the instrument with appropriate buffers and immersing the electrode into the ink jet inks. Particle size measurements were determined by Photon Correlation Spectroscopy using a Coulter N4 Plus Particle Size Analyzer (Beckman Coulter, Fullerton, Calif.). Chloride content was measured with a Dionex DX-120 Ion Chromotographer (Dionex Corp., Sunnyvale, Calif.).

Example 1

Preparation of Pigment Dispersions

This example describes a method for producing food grade ink jet inks from food grade lakes, butanol or ethanol, 1,2-propanediol, and shellac. Five illustrative pigment dispersion formulations are provided in Table 1 which appears at the end of this disclosure. The pigment dispersions were prepared according to the following procedure. Butanol or ethanol, shellac solution, and 1,2-propanediol were mixed together in a high shear rotor-stator mixer (model HSM-100LC from Ross (Hauppauge, N.Y.)) for five minutes at 1,500 to 2,000 rpm. FD&C Blue #1 aluminum lake or Carmine lake (9349 Carmine Lake available from Sensient Colors Inc. in St. Louis, Mo.) was then gradually added to the mixer and the speed was increased to 3,000–3,500 rpm. The lake was added in portions close to the vortex of the mixture. Mixing was then continued for 20 to 25 minutes. The resulting pre-mix was then poured into a water cooled Mini-Eiger mill (model MINI 100-VSE-EXP). The speed of the mill was increased slowly from 0 to 4,000 rpm over a period of about 5 minutes. Milling continued at a temperature of about 27 to 29° C. and the particle size was checked approximately every 30 minutes. The final mean particle size for the FD&C Blue #1 aluminum lake in the dispersions range from 150 to 250 nm with a standard deviation of about 15 to 55 nm.

Example 2

Preparation of Food Grade Ink jet Inks

This example describes a method for producing food grade ink jet inks from the pigment dispersions of Example 1, ethanol, shellac solution, and 1,2-propanediol. The ink jet ink formulations were prepared according to the following procedure. The ethanol, shellac solution, and 1,2-propanediol were mixed for about 10 minutes in a conventional mixer. The resulting diluent was then added to a pigment dispersion from Example 1 at a rate of approximately 30 ml/m while mixing. After all the diluent was added to the dispersion, mixing was continued for an additional 45 to 60 minutes. Finally, the ink formulation was filtered using a 2.3 µm filter. The viscosity, pH, surface tension, and particle size for the ink formulations was then determined. The results of these measurements are presented in Table 2 which appears at the end of this disclosure.

Example 3

Preparation of Food Grade Ink jet Inks

This example describes a method for producing low chloride food grade ink jet inks from pigment dispersions having the same component ratios as pigment dispersions C, E, F and G of Example 1, ethanol, shellac solution, and 1,2-propanediol. The lakes used to make these inks are low chloride content lakes. The low chloride ink jet ink formulations, made in accordance with the procedure of Example 2, are provided in Table 3 (in weight percent) which appears at the end of this disclosure.

The chloride content for each ink formulation was measured on a Dionex DX-120 Ion Chromatographer in accordance with the anion analysis procedure in the manufacturer's instructions. In order to avoid blockage of the ion chromatography lines, the ink samples were prepared as follows. About 15 grams of each ink and 15 grams of ion chromatography grade water was added to a 50 mL centrifuge tube. The samples were then vortexed for 5 minutes at 2500 rpm then centrifuged for 15 minutes at 2500 rpm to separate the heavy particles. The samples were then run through the Dionex DX-120 Ion Chromatographer. The results for inks C3–F1, shown in Table 3, show that food grade ink jet inks may be made with a chloride ion content of significantly less than 100 ppm. The results for inks G1 and G2 show that food grade ink jet inks may be made with a chloride ion content of significantly less than 20 ppm. Such inks are very attractive as food grade ink jet inks because they do not corrode printer parts. The low chloride ion content of inks G1 and G2 may be attributed to the use of a low chloride content pigment in the production of these inks. The lowering of the chloride ion content of ink G2 compared to ink G1 reflects the use of a lower chloride content shellac in the ink formulation. The lowering of the chloride ion content of ink F1 compared to ink C3 reflects the use of a lower chloride content shellac in the ink formulation.

Example 4

Ink Jet Printing Food Grade Inks onto a Fruit Roll-Up Substrate

The food grade ink jet inks from Table 2 were printed onto Betty Crocker fruit roll-ups using a Xaar piezo ink jet print head. The jetting temperature was room temperature (about 25 to 27° C.) and the jetting frequency was between about 3 and 6 kHz.

Example 5

Preparation of Pigment Dispersions and Inks Made Therefrom

This example describes a method for producing food grade ink jet inks from food grade lakes, butanol and ethanol, 1,2-propanediol, and shellac. The formulations for the pigment dispersions are provided in Table 4 and the formulations for the inks are provided in Table 5. The pigment dispersions and inks were prepared and their properties measured according to the procedures described in Examples 1–3 above.

TABLE 4

| Component | Pigment Dispersion H | Pigment Dispersion I |
|---|---|---|
| Butanol[a] | 56.7 | 56.7 |
| 6# Refined Glaze in Butanol[c] | 20.6 | |
| 6# Low Chloride Glaze in butanol[e] | | 20.6 |
| 1,2-Propanediol | 5.4 | 5.4 |
| FD&C Red #40 Aluminum Lake | 17.3 | 17.3 |

[a]These numbers do no include additional butanol introduced with the shellac.
[c]A 6 lb. cut confectioner's glaze available from Mantrose, Bradshaw and Zinsser Group (Westport, CT) containing about 50 wt. % shellac solids. This glaze has a chloride ion content of about 466 ppm.
[e]A 6 lb. cut confectioner's glaze containing approximately 45 wt. % non-bleached shellac solids in butanol. This glaze has a chloride ion content of about 144 ppm.

TABLE 5

| Component | Ink H1 | Ink I1 | Ink I2 |
|---|---|---|---|
| Ethanol[b] | 25 | 25 | 20 |
| 8# Esterified Shellac M-4[d] | 5 | 5 | 6.9 |
| 1,2-Propanediol | 40 | 40 | 33.1 |
| Pigment Dispersion H | 30 | | |
| Pigment Dispersion I | | 30 | 40 |
| Chloride Content (ppm) | 12.2 | 9.42 | 9.02 |
| Viscosity at 25° C. (cps) | 10 | 10.3 | 13.6 |
| Surface Tension at 25° C. (dynes/cm) | 28.9 | 28.8 | 28.9 |
| Apparent pH | 4.03 | 3.98 | 4.17 |

[b]These numbers do no include additional ethanol introduced with the shellac.
[d]An 8 lb. cut confectioner's glaze available from Mantrose, Bradshaw and Zinsser Group (Westport, CT) containing about 50 wt. % shellac solids.

The results for inks H1–I2, shown in Table 5, show that food grade ink jet inks may be made with a chloride ion content of significantly less than 20 ppm. The lowering of the chloride ion content in ink I1 compared to ink H1 reflects the use of a lower chloride content shellac in pigment dispersion I. The 6# glaze used in dispersion I contained approximately 45 wt. % shellac solids in butanol and had a chloride ion content of approximately 144 ppm. The 6# glaze used in dispersion H contained approximately 50 wt. % shellac solids in butanol and had a chloride ion content of approximately 466 ppm.

These low chloride ion content inks are very attractive as food grade ink jet inks because they are much less corrosive to printer parts than higher chloride content inks. To illustrate this corrosion tests were performed on stainless steel coupons exposed to the inks. In these tests stainless steel coupons were immersed in inks H1 and I1 for 72 hours. After 72 hours the coupons were inspected using scanning electron microscopy (SEM) at 1000× scope magnification and 10 KV accelerating voltage. The resulting SEM images revealed no evidence of pitting or metal removal.

The invention has been described with reference to various specific and illustrative embodiments. However, it should be understood that many variations and modifications may be made while remaining within the spirit and scope of the invention.

TABLE 1

| Component | Pigment Dispersion A | Pigment Dispersion B | Pigment Dispersion C | Pigment Dispersion D | Pigment Dispersion E | Pigment Dispersion F | Pigment Dispersion G |
|---|---|---|---|---|---|---|---|
| Butanol[a] | 57.5 | 56 | 56.7 | | 56.7 | 56.7 | 56.7 |
| Ethanol[b] | | | | 62 | | | |
| 6# Refined Glaze in Butanol[c] | 20 | 21 | 20.6 | | 22.9 | | |
| 6# Low Chloride Glaze in butanol[e] | | | | | | 20.6 | 20.6 |
| 8# Esterified Shellac M-4[d] | | | | 15 | | | |
| 1,2-Propanediol | 5 | 5.5 | 5.4 | 5.5 | 13.4 | 5.4 | 5.4 |
| FD&C Blue #1 Aluminum Lake | 17.5 | 17.5 | 17.3 | 17.5 | | 17.3 | |
| FD&C Low Chloride Blue Aluminum Lake | | | | | | | 17.3 |
| 9349 Carmine Lake | | | | | 7 | | |

TABLE 1-continued

| Component | Pigment Dispersion A | Pigment Dispersion B | Pigment Dispersion C | Pigment Dispersion D | Pigment Dispersion E | Pigment Dispersion F | Pigment Dispersion G |
|---|---|---|---|---|---|---|---|
| Mean Lake Size nm (Standard Deviation) | | 155.4 (25.8) | | 250.3 (17.2) | | | |

[a] These numbers do no include additional butanol introduced with the shellac.
[b] These numbers do no include additional ethanol introduced with the shellac.
[c] A 6 lb. cut confectioner's glaze available from Mantrose, Bradshaw and Zinsser Group (Westport, CT) containing about 50 wt. % shellac solids. This glaze has a chloride ion content of about 466 ppm.
[d] An 8 lb. cut confectioner's glaze available from Mantrose, Bradshaw and Zinsser Group (Westport, CT) containing about 50 wt. % shellac solids.
[e] A 6 lb. cut confectioner's glaze containing approximately 45 wt. % non-bleached shellac solids in butanol. This glaze has a chloride ion content of about 144 ppm.

TABLE 2

| Component | Ink A1 | Ink B1 | Ink B2 | Ink C1 | Ink C2 | Ink D1 | Ink D2 |
|---|---|---|---|---|---|---|---|
| Ethanol[b] | 25 | 25 | 30 | 20 | 45 | 45 | 31 |
| 8# Esterified Shellac M-4[d] | 5 | 5 | | | | 1 | 4 |
| Mantrolac R-100 in 1,2-Propanediol[f] | | | 10 | 40 | 15 | | |
| 1,2-Propanediol[g] | 40 | 40 | 30 | 20 | 30 | 34 | 40 |
| Pigment Dispersion A | 30 | | | | | | |
| Pigment Dispersion B | | 30 | 30 | | | | |
| Pigment Dispersion C | | | | 20 | 10 | | |
| Pigment Dispersion D | | | | | | 20 | 25 |
| Viscosity at 25° C. (cps) | 8.84 | 9.26 | 9.3 | 58.9 | 7.71 | 3.92 | 7.6 |
| Surface Tension at 25° C. (dynes/cm) | 29.1 | 39 | 28.4 | 31.3 | 27.9 | 22.7 | |
| Apparent pH | 4.29 | 4.06 | 4.7 | 4.8 | 4.76 | 4.05 | |
| Chloride Content (ppm) | | | | 327 | 157 | | |

[b] These numbers do no include additional ethanol introduced with the shellac.
[d] An 8 lb. cut confectioner's glaze available from Mantrose, Bradshaw and Zinsser Group (Westport, CT) containing about 50 wt. % shellac solids.
[f] A confectioner's glaze available from Mantrose, Bradshaw and Zinsser Group (Westport, CT) containing about 50 wt. % shellac solids.
[g] These numbers do not include additional 1,2-propanediol introduced with the pigment dispersion or the shellac.

TABLE 3

| Component | Ink C3 | Ink C4 | Ink C5 | Ink E1 | Ink E2 | Ink F1 | Ink G1 | Ink G2 |
|---|---|---|---|---|---|---|---|---|
| Ethanol[b] | 25 | 30 | 20.9 | 40 | 25 | 25 | 25 | 25 |
| 8# Esterified Shellac M-4[d] | 5 | 5 | 7.3 | 5 | 5 | 5 | 5 | |
| 6# Low Chloride Glaze in butanol[e] | | | | | | | | 6.6 |
| 1,2-Propanediol[g] | 40 | 50 | 28.3 | 40 | 34 | 40 | 40 | 38.4 |
| Pigment Dispersion C | 30 | 15 | 43.5 | | | | | |
| Pigment Dispersion E | | | | 15 | 36 | | | |
| Pigment Dispersion F | | | | | | 30 | | |
| Pigment Dispersion G | | | | | | | 30 | 30 |
| Chloride Content (ppm) | 52 | 40 | 64 | 50 | 82 | 28 | 4.3 | 1.8 |
| Viscosity at 25° C. (cps) | 12.7 | | | | | 10.6 | 11.7 | 11.7 |
| Surface Tension at 25° C. (dynes/cm) | 29.3 | | | | | 28.9 | 28.9 | 28.7 |
| Apparent pH | 4.31 | | | | | 3.93 | 4.19 | 3.88 |

[b] These numbers do no include additional ethanol introduced with the shellac.
[d] An 8 lb. cut confectioner's glaze available from Mantrose, Bradshaw and Zinsser Group (Westport, CT) containing about 50 wt. % shellac solids.
[e] A 6 lb. cut confectioner's glaze containing approximately 45 wt. % non-bleached shellac solids in butanol. This glaze has a chloride ion content of about 144 ppm.
[g] These numbers do not include additional 1,2-propanediol introduced with the pigment dispersion or the shellac.

What is claimed is:

1. A food grade ink comprising a food grade pigment; a food grade lower alcohol; at least about 20 wt. % 1,2-propanediol; and a shellac;
   wherein the food grade ink has a viscosity of no more than about 100 cps at 25° C.

2. The ink of claim 1 comprising at least about 30 wt. % 1,2-propanediol.

3. The ink of claim 1 comprising at least about 20 wt. % food grade lower alcohol.

4. The ink of claim 1 wherein the food grade lower alcohol comprises butanol.

5. The ink of claim 4, further comprising ethanol.

6. The ink of claim 5 comprising at least about 5 wt. % butanol and at least about 15 wt. % ethanol.

7. The ink of claim 1 wherein the food grade pigment is a food grade lake.

8. The ink of claim 7 wherein the weight ratio of shellac to lake in the ink is about 0.8 to 5.

9. The ink of claim 7 wherein the weight ratio of shellac to lake in the ink is about 5 to 7.

10. The ink of claim 1 comprising at least about 1 wt. % food grade lake.

11. The ink of claim 1 comprising about 5 to 10 wt. % shellac.

12. The ink of claim 1 comprising about 2 to 25 wt. % shellac.

13. The ink of claim 1 comprising at least about 30 to 45 wt. % 1,2-propanediol, about 25 to 70 wt. % food grade lower alcohol, about 5 to 25 wt % shellac and about 1 to 5.5 wt. % food grade pigment.

14. The ink of claim 1 comprising no more than about 5 wt. % water.

15. The ink of claim 1 wherein the ink has a viscosity of no more than about 75 cps at 25° C.

16. The ink of claim 1 wherein the ink has a viscosity of no more than about 15 cps at 25° C.

17. The ink of claim 1 wherein the ink has a surface tension of about 20 to 40 dynes per cm at 25° C.

18. An edible substrate having the food grade ink of claim 1 applied to a least a portion of at least one substrate surface.

19. The edible substrate of claim 18 wherein the surface is a non-porous surface.

20. The edible substrate of claim 18 wherein the edible substrate is selected from the group consisting of chocolate, candies, breakfast bars, crackers, waffles, mints, fruit roll-ups, chewing gum, biscuits, cereal, taco shells, granola bars, rice cakes, cookies, pie crusts, cakes, including snack cakes, marshmallows, pasta, and bread products.

21. A method of applying a food grade ink to a surface of an edible substrate, comprising ink jet printing the ink of claim 1 onto the surface.

22. A food grade ink jet ink comprising a food grade pigment; a food grade lower alcohol; 1,2-propanediol; and shellac; wherein the ink jet ink has a viscosity of about 5 to 75 cps at 25° C., a surface tension of about 25 to 50 dynes/cm at 25° C. and a chloride content of no more than about 100 ppm and wherein the weight ratio of 1,2-propanediol to shellac is at least about 1.5.

23. A food grade ink jet ink comprising a lake of a food grade, water-soluble colorant; a food grade alcohol comprising butanol; 1,2-propanediol; and shellac;
wherein the ink jet ink has a viscosity of about 5 to 75 cps at 25° C., a surface tension of about 25 to 50 dynes/cm at 25° C., and an apparent pH of no more than about 5.

24. The ink of claim 23 comprising at least about 25 wt. % food grade lower alcohol comprising butanol, and at least about 25 wt. % 1,2-propanediol, wherein the food grade lake has a mean particle size of no more than about 2 microns.

25. A food grade ink jet ink comprising about 1 to 10 wt. % of a lake of a food grade water soluble colorant, about 30 to 45 wt. % 1,2-propanediol, about 5 to 25 wt. % butanol, about 15 to 50 wt. % ethanol and at least about 5 wt. % shellac wherein the ink jet ink has a viscosity of about 5 to 75 cps at 250C., a surface tension of about 25 to 50 dynes/cm at 25° C., and an apparent pH of no more than about 5.5.

26. The ink of claim 25 comprising about 5 to 20 wt. % shellac, wherein the ink jet ink has a viscosity of about 5 to 15 cps at 25° C.

27. A method of preparing a food grade ink jet ink comprising:
(a) subjecting an admixture comprising food grade pigment, a first food grade lower alcohol, 1,2-propanediol and shellac to shear to form a pigment dispersion; and
(b) mixing the pigment dispersion with a second food grade lower alcohol, additional 1,2-propanediol and additional shellac to form an inkjet ink.

28. The method of claim 27 wherein the food grade pigment is an FD&C Lake and the first food grade lower alcohol comprises butanol.

29. The method of claim 28 wherein the second food grade lower alcohol comprises ethanol.

30. The method of claim 27 wherein the first and second food grade lower alcohols are the same alcohol.

31. The method of claim 27 wherein the mixture comprises about 60 to 70 wt. % of first food grade lower alcohol, about 5 to 15 wt. % shellac, about 1 to 15 wt. % 1,2-propanediol, and about 5 to 20 wt. % lake of a food grade, water-soluble colorant.

32. The method of claim 31 wherein the first food grade lower alcohol comprises butanol.

33. The method of claim 27 wherein the ink jet ink comprises about 30 to 45 wt. % 1,2-propanediol, about 25 to 70 wt. % food grade lower alcohol, about 5 to 25 wt % shellac and about 1 to 10 wt. % lake of a food grade, water-soluble colorant.

34. A food grade ink jet ink comprising a food grade lake; a food grade lower alcohol; 1,2-propanediol; and shellac;
wherein the ink has a chloride ion content of no more than about 50 ppm and a viscosity of no more than about 100 cps at 25° C. and wherein the weight ratio of 1,2-propanediol to shellac is at least about 1.5.

35. The ink of claim 34 wherein the ink has a chloride ion content of no more than about 20 ppm.

36. The ink of claim 34 wherein the ink has viscosity of about 5 to 15 cps at 25° C.

37. The ink of claim 34 having a surface tension of about 20 to 40 dynes per cm at 25° C.

38. A food grade ink jet ink comprising a food grade lake; a food grade lower alcohol; at least about 30 wt. % 1,2-propanediol; and shellac;
wherein the ink has a chloride ion content of no more than about 50 ppm and a viscosity of no more than about 100 cps at 25° C.

39. The ink of claim 34 wherein the food grade lower alcohol comprises butanol.

40. The ink of claim 39, further comprising ethanol.

41. The ink of claim 34 comprising at least about 1 wt. % food grade lake.

42. The ink of claim 34 comprising about 5 to 10 wt. % shellac.

43. The ink of claim 34 comprising no more than about 5 wt. % water.

44. The ink of claim 34 wherein the ink has an apparent pH of no more than about 5.5.

45. An edible substrate having the food grade ink of claim 34 applied to at least a portion of at least one substrate surface.

46. The ink of claim 1, wherein the weight ratio of 1,2-propanediol to shellac is at least about 1.5.

47. A method of applying a food grade ink to a surface of an edible substrate, comprising ink jet printing the ink of claim 13 onto the surface.

48. The edible substrate of claim 18, wherein the ink has a weight ratio of 1,2-propanediol to shellac of at least about 1.5.

49. A method of applying a food grade ink to a surface of an edible substrate, comprising ink jet printing the ink of claim 22 onto the surface.

50. The method of claim 23, wherein the weight ratio of 1,2-propanediol to shellac is at least about 1.5.

51. A method of applying a food grade ink to a surface of an edible substrate, comprising ink jet printing the ink of claim 23 onto the surface.

52. A method of applying a food grade ink to a surface of an edible substrate, comprising ink jet printing the ink of claim 24 onto the surface.

53. The ink of claim 25, wherein the weight ratio of 1,2-propanediol to shellac is at least about 1.5.

54. A method of applying a food grade ink to a surface of an edible substrate, comprising ink jet printing the ink of claim 25 onto the surface.

55. The method of claim 31, wherein the ink has a weight ratio of 1,2-propanediol to shellac of at least about 1.5.

56. A method of applying a food grade ink to a surface of an edible substrate, comprising ink jet printing the ink of claim 34 onto the surface.

57. A method of applying a food grade ink to a surface of an edible substrate, comprising ink jet printing the ink of claim 38 onto the surface.

* * * * *